United States Patent [19]

Trenkler

[11] Patent Number: 4,801,173
[45] Date of Patent: Jan. 31, 1989

[54] REMOVABLE ROOF FOR A MOTOR VEHICLE

[75] Inventor: Werner Trenkler, Asperg, Fed. Rep. of Germany

[73] Assignee: Dr. Ing. h.c.F. Porsche, Aktiengesellschaft, Stuttgart, Fed. Rep. of Germany

[21] Appl. No.: 458,828

[22] Filed: Jan. 18, 1983

[30] Foreign Application Priority Data

Jan. 22, 1982 [DE] Fed. Rep. of Germany ....... 3201895

[51] Int. Cl.$^4$ ............................ B60J 7/12; B60J 7/185
[52] U.S. Cl. ............................ 296/218; 296/224; 296/219; 292/106; 292/126; 292/302; 292/DIG. 5
[58] Field of Search ............... 296/216, 219, 218, 220, 296/224; 160/378; 292/100, 106, 126, 302, DIG. 5

[56] References Cited

U.S. PATENT DOCUMENTS

| | | | |
|---|---|---|---|
| 2,305,715 | 12/1942 | Keller | 292/DIG. 5 |
| 2,723,147 | 11/1955 | Slaughter, Jr. et al. | 292/302 |
| 3,348,877 | 10/1967 | Caramanna | 296/219 |
| 3,476,437 | 11/1969 | Schroeder et al. | 296/218 |
| 3,526,427 | 9/1970 | Trenkler et al. | 296/219 |
| 3,712,665 | 1/1973 | Klein | 296/218 |
| 3,819,227 | 6/1974 | Carli | 296/219 |
| 3,891,252 | 6/1975 | Lehmann | 292/DIG. 5 |

Primary Examiner—Dennis H. Pedder
Attorney, Agent, or Firm—Barnes & Thornburg

[57] ABSTRACT

A removable folding roof for a motor vehicle, especially for a passenger motor vehicle, which extends between a windshield frame and a roll bar and which includes laterally disposed longitudinally extending girders, several struts extending parallel to the girders and a roof covering. The folding roof is detachably retained at the windshield frame and at the roll bar by means of locking mechanisms. To achieve an effective support of the folding roof and a simple assembly operation for latching and tensioning the folding roof to the vehicle body, the longitudinally extending girders are placed on the upwardly extending tensioning levers of the locking mechanisms which are then pivoted downwardly along with the edges of the top to a latched position. An automatic tensioning of the folding roof in the vehicle transverse direction and simultaneous latching of the roof to the vehicle body is achieved by the pivoting of the tensioning lever to a lowered position. Additionally, the folding roof is connected with the windshield frame and the roll bar intermediate the locking mechanisms by way of several support members.

22 Claims, 4 Drawing Sheets

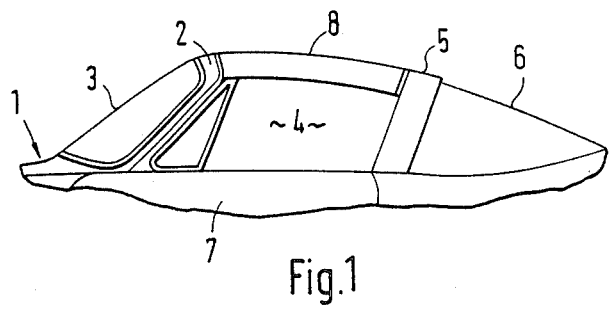
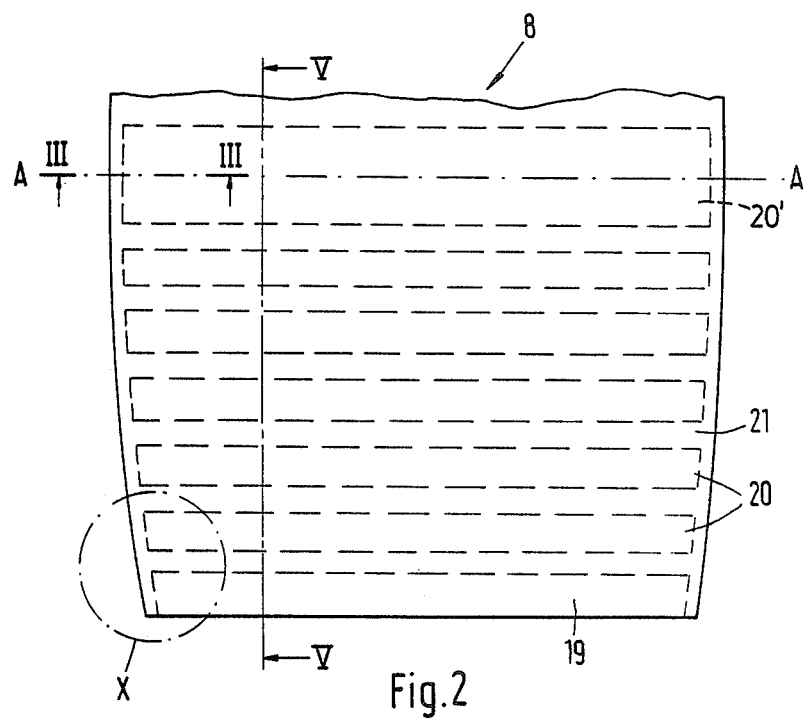

REMOVABLE ROOF FOR A MOTOR VEHICLE

The present invention relates to a removable folding roof for a motor vehicle, especially for a passenger motor vehicle, which extends between a windshield frame and a roll-bar and which includes laterally disposed longitudinally extending girders, several struts extending parallel the girders and a roof covering. The folding roof is detachably retained at the windshield frame and at the roll-bar by means of locking mechanisms arranged adjacent the longitudinal girders.

A known folding roof (German Offenlegungsschrift No. 14 55 743) of the aforementioned type is held in position at the windshield frame and at the roll-bar by means of locking mechanisms extending in the vehicle longitudinal direction. This prior art arrangement entails the disadvantage that during the assembly at first one side of the folding roof has to be latched to the fixed body parts and thereafter the folding roof has to be stretched manually in the vehicle transverse direction. Subsequently, the other side of the folding roof has to be latched, for which purpose complicated manipulations are required. Therebeyond, this prior art folding roof is retained exclusively at the sections of the windshield frame and roll-bar which, as viewed in the vehicle transverse direction, are located outwardly, as a result of which the area of the folding roof disposed between the locking mechanisms lifts off from the sealing body during the drive owing to the occurring pressure conditions, especially at the windshield frame, which causes disturbing wind noises.

It is the aim of the present invention to undertake such measures at a folding roof, respectively, at the body that a secure latching of the folding roof at the body and a tensioning of the folding roof in the vehicle transverse direction is brought about by a simple assembly operation. Additionally, an effective support over the entire width of the folding roof at the body parts, especially at the windshield frame is to be achieved.

The underlying problems are solved according to the present invention in that for purposes of closing the folding roof, the longitudinal girders are placed on upright tensioning levers of the locking mechanism which are supported at the vehicle, whereby by pivoting the tensioning levers, an automatic tensioning of the folding roof in the vehicle transverse direction is achieved and the tensioning levers in their lowered position cooperate at the same time with latching devices of the locking mechanisms, and in that the folding roof is connected with the windshield frame and the roll-bar intermediate the locking mechanisms by way of several support members.

The advantage principally achieved with the present invention reside in that as a result of the tensioning levers cooperating with the longitudinal girders of the folding roof by way of a pin-connection, a simultaneous tensioning of the folding roof in the vehicle transverse direction and a latching with the body parts is possible in a simple assembly operation during the lowering movement of the tensioning levers. Additionally, a functionally satisfactory support of the folding roof at the body parts is achieved by the arrangement of several support members distributed over the entire vehicle width between folding roof and body parts so that a lifting off of the folding roof, especially at the windshield frame, is avoided and thus no disturbing wind noises occur. Furthermore, only a small force is required for stretching the folding roof in the vehicle transverse direction by the stretching levers pivotally connected at body parts.

These and further objects, features and advantages of the present invention will become more apparent from the following description when taken in conjunction with the accompanying drawing which shows, for purposes of illustration only, one embodiment in accordance with the present invention, and wherein:

FIG. 1 is a partial side elevational view of a passenger motor vehicle with a removable folding roof in accordance with the present invention;

FIG. 2 is a partial plan view on an enlarged scale, of the folding roof in accordance with the present invention;

Figure 3:
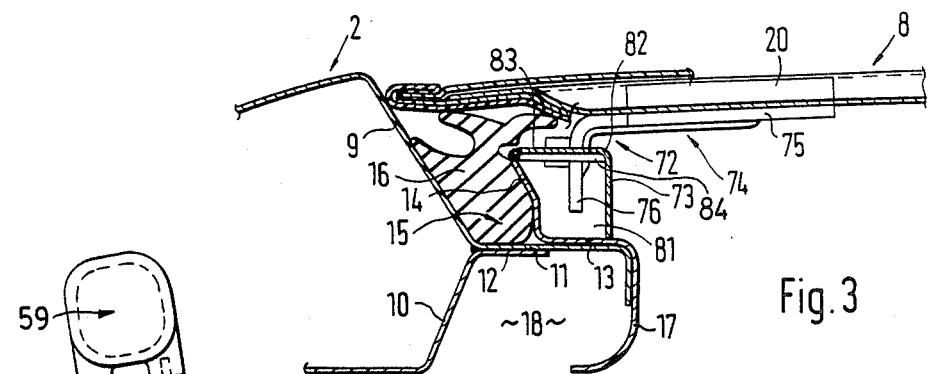
FIG. 3 is a cross-sectional view of a portion of the top, on an enlarged scale, taken along line III—III of FIG. 2, shown relative to a portion of the windshield frame.

Referring now to the drawing wherein like reference numerals are used throughout the various views to designate like parts and more particularly to FIG. 1, the motor vehicle generally designated by reference numeral 1 includes a windshield frame 2 with a windshield 3, a roll-bar 5 extending over a passenger space 4, a rear window 6 and doors 7. A removable folding roof 8 which is arranged between and detachably secured to the windshield frame 2 and the roll-bar 5. The windshield frame 2 (FIG. 3) is constructed as box-shaped hollow bearer and is composed of pressed-out sheet metal parts or stampings 9 and 10 which are connected with each other along generally horizontally extending flanges 11 and 12 by spot welding (FIG. 3). A frame part 13 which is mounted on the flange 11, includes a generally upwardly directed web 14 that together with a section of the pressed-out part 9 forms a channel 15 for a sealing member 16. The frame part 13 additionally includes a downwardly directed portion 17 with a bent end which together with sections of the pressed-out part 10 forms a downwardly opening recess-shaped spaces 18.

The constructive assembly of the roll-bar 5 is similar to the windshield frame 2 within the connecting area of the folding roof 8.

The folding roof 8 extends transversely of the vehicle 1 between the two doors 7 and rests on sealing elements 16 of the windshield frame 2 and of the roll-bar 5. The roof 8 includes girders 19 which are laterally disposed and which extend longitudinally with respect to the direction of the vehicle (FIGS. 2, 4 and 5), several struts 20 (FIGS. 2, 3 and 5) arranged at a distance to one another and extending parallel to the laterally disposed longitudinally extending girders 9 and a roof covering 21 (FIGS. 2 and 5).

The laterally disposed longitudinally extending girders 19 extend to an area adjoining the doors 7 of the motor vehicle and are made of light-metal casting.

Figure 5:
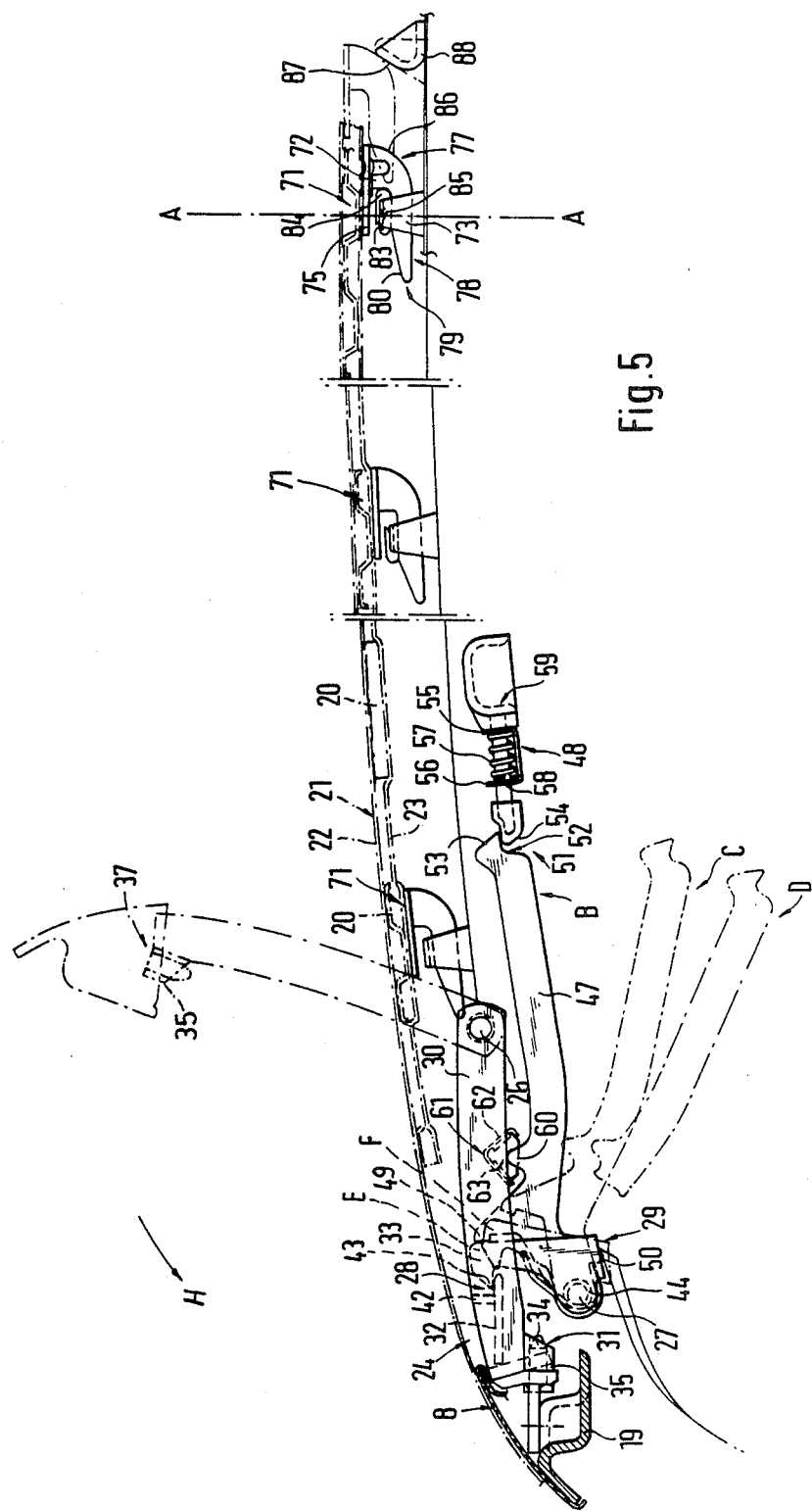
FIG. 5 is a cross-sectional view, taken along line V—V of FIG. 1.

The roof covering 21 is formed by an outer skin 22 and an inner cover 23 and is foldable (FIG. 5). The inner cover 23 includes two layers which are sewn together in the vehicle longitudinal direction on both sides of each of the struts 20. The struts 20 are made of a form-rigid material. The strut 20 extending in the vehicle longitudinal center plane A—A has preferably a greater width than the other struts 20 and serves with a removed folding roof 8 as support for the roof halves when the roof halves are folded together and disposed side by side.

The mounting and retention of the folding roof 8 to the windshield frame 2 and of the roll-bar 3 is accomplished by locking mechanisms generally designated by reference numeral 24 (FIGS. 4, 5 and 6) which are provided in the recess-shaped spaces 18.

Figure 8:
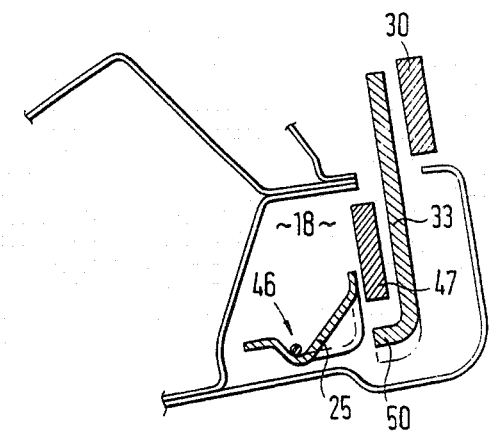
FIG. 8 is a cross-sectional view taken along line VIII—VIII of FIG. 4.
Figure 9:
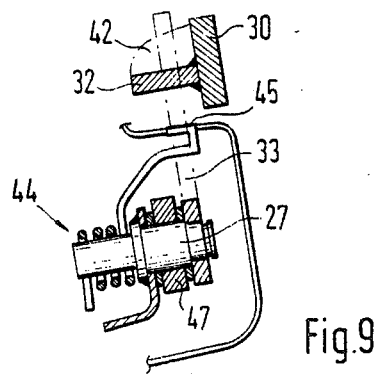
FIG. 9 is a cross-sectional view taken along line IX—IX of FIG. 4.

Each locking mechanism 24 includes a bearing plate 25 secured to the vehicle body, e.g., the windshield frame 2 or the roll bar 5 (FIGS. 4 and 6); a latching mechanism generally designated by reference numeral 28 and an unlatching mechanism generally designated by reference numeral 29 of the locking installation 24 are operable about bearing shafts 26 and 27 (FIGS. 4, 5, 7 and 9) aligned approximately in the vehicle longitudinal direction and supported at the bearing plate 25. The latching mechanisms 28 includes a stretching or tensioning lever 30 (FIGS. 4, 5 and 6) rotatably connected on the bearing shaft 26 which cooperates with the folding roof 8 by way of a connecting member 31 (FIG. 5) and with a latching hook 33 (FIGS. 5 and 8) by way of a latching plate 32 (FIGS. 5 and 9).

Each connecting member 31 is formed by a pin 34 (FIG. 5) and a sleeve 35, the pins 34 are arranged at end sections (FIG. 4) of the longitudinally extending girders 19 and the sleeves 35 are arranged at the free end 37 (FIG. 5) of the tensioning levers 30. The engagement of the pins 34 in the sleeve 35 takes place essentially without play, as a result of which the folding roof is accurately positioned on the vehicle body in the vehicle longitudinal direction.

Figure 6:
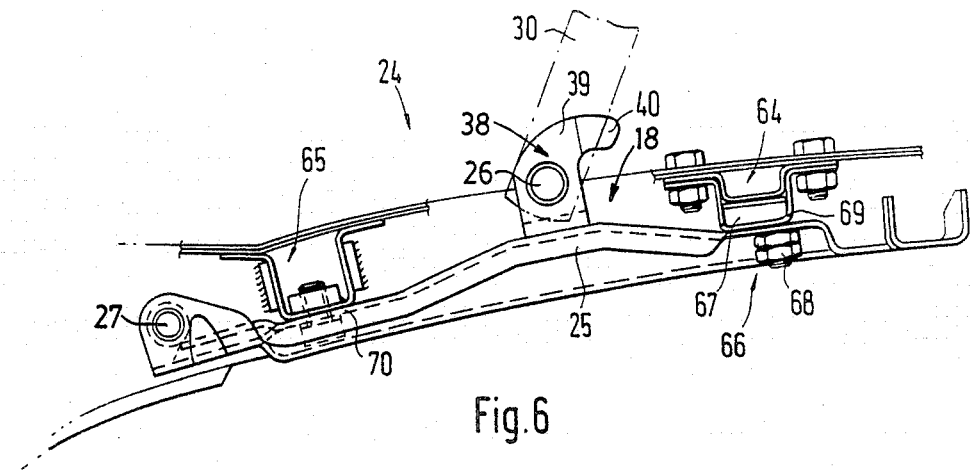
FIG. 6 is a view taken in the same direction as FIG. 5, illustrating the bearing plate secured to the vehicle body used with the folding roof of the present invention.
Figure 7:
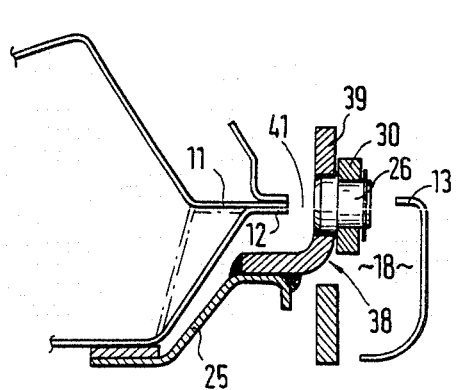
FIG. 7 is a cross-sectional view taken along line VII—VII of FIG. 4.

For the bearing support of the tensioning lever 30, an angularly bent retaining member 38 is provided at the bearing plate 25 (FIGS. 4 and 7), on the upright web 39 of which is secured the bearing shaft 26 (FIG. 7). An abutment 46 (FIGS. 4 and 6) is provided on the web 39 of the retaining member 38, which retains the tensioning lever 30 in its upright, slightly inclined position (FIG. 6).

Since the tensioning lever 30 and the bearing plate 25 extend partially above the recess-shaped spaces 18, openings 41 are provided locally in the flanges 11 and 12 and in the frame part 13 (FIG. 7). The latching plate 32 (FIG. 9) extends, as viewed in side view, approximately at a right angle to the tensioning lever 30 and is retained thereat by a welded connection. Furthermore, for the additional mounting support of the latching plate 32 a support member 42 is provided which is arranged above the latching plate 32 and is connected therewith and with the tensioning lever by welding (FIGS. 5 and 9).

The latching hook 33 is supported with a nose portion 43 against the top surface of the latching plate 32 and is rotatably mounted on the bearing shaft 27. The bearing shaft 27 is arranged offset relative to the bearing shaft 26. The latching hook 33 is stressed by a spring element 44 (FIG. 9) which is effective in the counterclockwise direction as viewed in FIG. 5, and is thus held in a latching position E. The spring element 44 is arranged coaxially on the bearing shaft 27. It engages, on the one hand, in an opening 45 (FIG. 9) of the latching hook 33 and is supported, on the other, at a groove-shaped section 46 of the bearing plate 25 (FIG. 8).

The unlatching mechanism 29 includes an actuating lever 47 and a latching member generally designated by reference numeral 48 which is under spring tension, whereby the actuating lever 47 cooperates in its closing position B with the latching member 48 (FIG. 5). The actuating lever 47, like the latching hook 33, is pivoted about the bearing shaft 47 (FIG. 9). Additionally, the actuating lever 27 is constructed moveable relative to the latching hook 33 a predetermined amount. On the one hand, it cooperates, in its closing position B with the latching hook 33 by way of an offset abutment section 49 (FIG. 5), whereby the latching hook 33 is additionally secured against unlatching. On the other hand, the actuating lever 47 cooperates with an entrainment portion 50 formed at the bottom of the latching hook 33 and more particularly when the actuating lever 47 is in a lowered intermediate position C. By a further downwardly directed movement of the actuating lever 47 into its open position D, the latching hook 33 is displaced from a latching position E into an unlatching position F in which it comes out of engagement with the latching plate 32.

The free end 51 of the actuating lever 47 points toward the vehicle center and includes a step-shaped offset 52 and an inclined slide surface 53. During the movement of the actuating lever 47 from its open position D into its closing position B, the slide surface 53 cooperates with a guide surface 54 of the latching member 48. The latching member 48 is guided in upright wall sections 55 and 56 (FIG. 5) of the bearing plate 25 and is provided with a coaxially arranged spring 57 within the area between these walls 55 and 56. The spring 57 is supported, at one end, by the wall section 55 and, at the other end, by a pin 58. The latching member 48 is connected with an actuating handle 59 outside of the wall section 55 disposed toward the vehicle center.

In order for the locking mechanisms 24 to not cause any disturbing movements or noises when the folding roof 8 is removed, the tensioning lever 30 and the actuating lever 47 are fixed. For this purpose, the actuating lever 47 is brought into its closing position B and retained in this position by the latching member 48 and movement of the tensioning lever 30 in the upward direction is prevented by the cooperation of latching plate 32 and latching hook 33. In order for the tensioning lever 30 to not drop downwardly due to its own weight, a cam 60 (FIG. 5) is arranged at the actuating lever 47 which is supported in a recess 61 of the tensioning lever 30. The recess 61 is formed by an angularly shaped housing 62, in the interior space of which is mounted a damping member 63 formed of elastic material (FIG. 5).

For purposes of tolerance compensation, the locking mechanisms 24 are constructed so as to be adjustable in the transverse direction of the vehicle. This is achieved by adjusting mechanisms, generally designated by reference numeral 66, being provided between each bearing plate 25 and the brackets 64 and 65 of the body (FIG. 6). Each adjusting mechanism 66 includes essentially a circular plate 67, on which a fastening element such as a bolt 68 is eccentrically secured. The plate 67 is supported inside of this bracket 64 and the bolt 68 cooperating with the bearing plate 25 is guided in a slot opening 69 of the bracket 64 extending in the vehicle transverse direction and, respectively, is adjustable in this slot opening 69.

Figure 4:
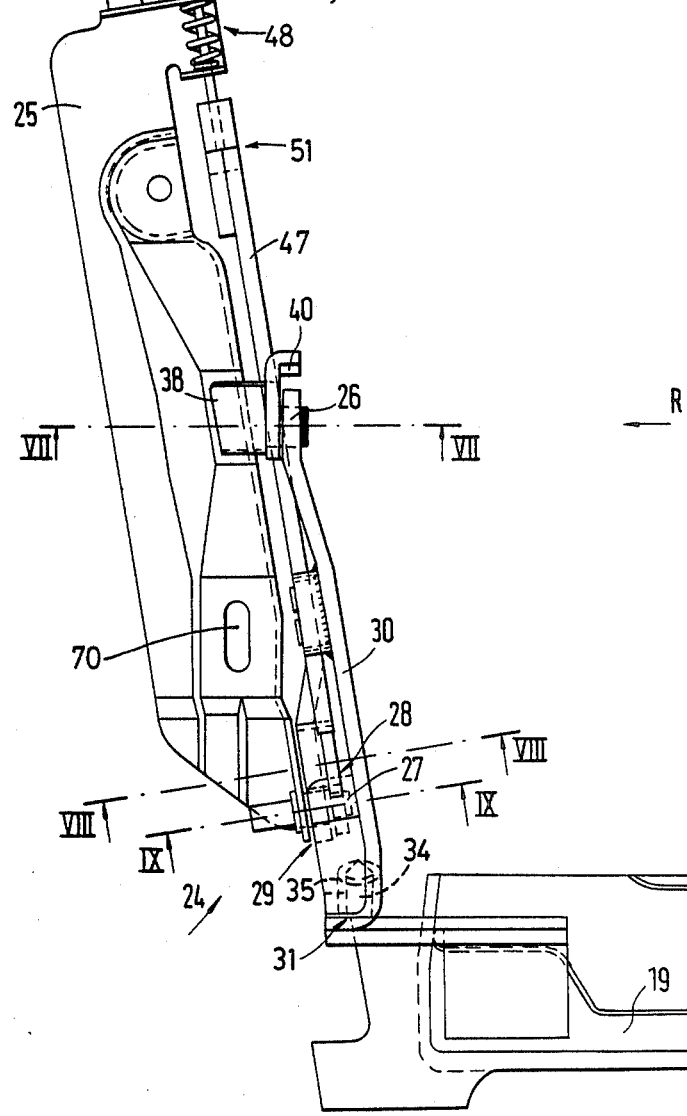
FIG. 4 is a detailed plan view view, on an enlarged scale, illustrating the details of the locking mechanism and longitudinally extending girder within the area of the circle X of FIG. 2.

On the side of the adjusting mechanism 66 opposite the bolt 68, a welded-on nut is provided inside the bracket 65, into which is inserted a fastening bolt retaining the bearing plate 25 in position. The bearing plate 25 is provided with a slot opening 70 also extending in the vehicle transverse direction within the area where the fastening bolt passes therethrough (FIGS. 4 and 6).

In order to achieve an effective support of the folding roof 8 over its entire width, the folding roof 8 is connected with the windshield frame 2 and the roll-bar 5 intermediate the locking mechanisms 24 by way of several support members generally designated by reference numerals 71, and more particularly in such a manner that the support members 71 fix the folding roof 8 vertically relative to the windshield frame 2 and roll bar 5, yet enable a movement in the transverse direction of the vehicle (FIG. 5).

The support members 71 are formed by detent hooks 72 mounted on the folding roof 8 which cooperate with receiving means 73 on the windshield frame 2 and the roll bar 5, respectively.

The detent hooks 72 are secured at the end sections 74 of the struts 20 and each detent hook 72 includes an approximately horizontally extending section 75 (FIG. 3) and a vertically downwardly projecting section 76, whereby the section 76 cooperates with the receiving means 73. The section 76 is generally L-shaped, whereby the short leg 77 (FIG. 5) is directed downwardly, and the longer leg 78 extends in the transverse of the vehicle. An inclined abutment surface 80 is formed at the free ends 79 of the legs 78. The receiving means 73 are formed by box-shaped laterally open members 81, whereby the members 81 are composed of the frame part 13 and of an angularly shaped element 82 connected therewith (FIG. 3). The elements 82 are connected with the frame part 13 by welding. In order to achieve a noise-free cooperation of the receiving means 73 with the detent hooks 72, a glide shoe 84 of plastic material is mounted on the upper wall section 83 cooperating with the detent hook 72, whereby the glide shoe 84 and wall section 83 are connected by way of clip-on or snap-in connection 85 (FIGS. 3 and 5). The free ends 79 of the longer legs 78 of the detent hooks 72 are directed toward the sides of the vehicle, i.e., transverse to a vehicle longitudinal center plane A—A.

For purposes of achieving an easy assembly of the folding roof 8, at least one detent hook 72 of the folding roof 8—preferably the detent hook extending in the vehicle longitudinal plane A—A—includes a guide surface 86 which cooperates with a slide surface 87 of a guide element 88 fixedly mounted on the body, whereby the detent hook 72 is automatically displaced in the direction of the receiving means 73 during assembly. The guide elements 88 are arranged both on the windshield frame 2 and on the roll-bar 5 (FIG. 5).

OPERATION

The operation of the locking mechanism is as follows:

During the installation of the folded-together folding roof 8, the center strut 20 which is constructed wider, is brought into its prescribed installation position. The detent hooks 72 mounted on the strut 20 are moved by the guide elements 88 into the adjacent receiving means 73. Subsequently thereto, the two halves of the folding roof 8 are spread out transversely to the longitudinal center plane A—A of the vehicle, whereby the detent hooks 72 cooperate with receiving means 73 of the body. Finally, the pins 34 of the longitudinally extending girders 19 are introduced into the sleeves 35 of the tensioning levers 30 which have been moved to an upright position and the actuating lever 47 is moved into its intermediate position C. During the pivoting of the tensioning lever 30 in the direction H (FIG. 5), an automatic stretching of the folding roof 8 in the vehicle transverse direction occurs and a simultaneous latching between the latching plate 32 and the closing hook 33 takes place.

For opening and/or removal of the folding roof 8, the actuating handle 59 of the latching member 51 is moved against the spring force toward the vehicle center, as a result of which the actuating lever 47 automatically is lowered to intermediate position C. In this intermediate position C, a section of the actuating lever 47 rests on the entrainment member 50 of the latching hook 33.

By a further downwardly directed movement of the actuating levers 47, the latching hook 33 is forcibly pivoted in the clockwise direction into an unlatching position F, as a result of which the folding roof 8, which is prestressed in the vehicle transverse direction, is automatically moved along with the lever 30 in the upward direction. The folding roof 8 can now be removed from the vehicle by disengaging the pins 34 from the sockets 35 and hooks 72 from the receiving means 73.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A removable folding roof for a motor vehicle, which extends between a windshield frame and a roll bar and which includes laterally disposed longitudinally extending girders, a plurality of struts extending generally parallel to the girders and a roof covering, the folding roof being detachably secured to the windshield frame and the roll bar by a plurality of locking mechanisms, each locking mechanism being arranged within an area adjacent a respective end of one of the girders, each said locking mechanism comprising tensioning lever means pivotally supported relative to the vehicle for simultaneously affecting stretching of the folding roof in a direction transverse to the direction of travel of the vehicle and for detachably securing the roof relative to the vehicle body by pivoting of the tensioning lever means to a lowered position, said folding roof being operatively connected with the windshield frame and the roll bar intermediate the locking mechanisms by a plurality of support members.

2. A folding roof according to claim 1, wherein each of the locking mechanisms includes connecting means for aligning and securing the roof relative to the vehicle body, each connecting means including a pin and a sleeve member.

3. A folding roof according to claim 1, wherein each locking mechanism includes an unlatching means which includes an actuating lever and a spring-loaded latching member, the free end of the actuating lever, in its closing position, engaging with the latching member.

4. A folding roof according to claim 1, wherein each locking mechanism includes a latching plate mounted on the tensioning lever means for cooperating with a spring-loaded latching hook.

5. A folding roof according to claim 4, wherein the latching hook and the tensioning lever means are rotatably supported about bearing shafts extending generally in the longitudinal direction of the vehicle, the bearing shafts being retained by a bearing plate means securely connected with a respective windshield frame and a roll bar.

6. A folding roof according to claim 5, wherein the actuating lever is relatively movably arranged on the bearing shaft of the latching hook, said actuating lever, in its closing position, securing the latching hook against free pivoting being operable to displace the latching hook into an unlatching position.

7. A folding roof according to claim 5, wherein an abutment is provided at the bearing plate means for retaining the tensioning lever means in an upright position.

8. A folding roof according to claim 7, wherein each bearing plate means is secured by bracket means arranged at the respective windshield and roll-bar and is adjustable in the vehicle transverse direction by way of an adjusting means.

9. A folding roof according to claim 8, wherein the tensioning lever means and the actuating lever are adapted to be fixed relative to the vehicle body when the folding roof is removed.

10. A folding roof according to claim 9, wherein a cam disposed on the actuating lever is supported in a recess of the tensioning lever means when the roof is removed and the tensioning lever means and actuating lever are fixed.

11. A folding roof according to claim 1, wherein the plurality of support members includes detent hooks mounted on the folding roof which cooperate with receiving means on the windshield frame and roll bar.

12. A folding roof according to claim 11, wherein the section of the detent hooks cooperating with the receiving means is generally L-shaped, as viewed in front view, the longer leg of the L-shaped detent hook extending essentially in the transverse direction of the vehicle and being provided with an inclined abutment surface at its free end.

13. A folding roof according to claim 12, wherein a glide shoe means of plastic material is mounted over an upper wall section of the receiving means for cooperating with the detent hook.

14. A folding roof according to claim 12, wherein the free ends of the longer leg of the detent hooks are directed toward the sides of the vehicle.

15. A folding roof according to claim 14, wherein at least one detent hook is provided with a guide surface which cooperates with a guide surface of a guide means fixedly mounted on the vehicle, whereby the detent hook is displaced automatically in the direction toward the receiving means.

16. A folding roof according to claim 11, wherein each locking mechanism includes an unlatching means which includes an actuating lever and a spring-loaded latching member, the free end of the actuating lever, in its closing position, engaging with the latching member.

17. A folding roof according to claim 16 wherein each latching means includes a latching plate mounted on the tensioning lever means for cooperating with a spring-loaded latching hook.

18. A folding roof according to claim 17, wherein each of the locking mechanisms includes connecting means for aligning and securing the roof relative to the vehicle body, each connecting means including a pin and a sleeve member.

19. A folding roof according to claim 17, wherein the latching hook and the tensioning lever means are rotatably supported about bearing shafts extending generally in the longitudinal direction of the vehicle, the bearing shafts being retained by a bearing plate means securely connected with a respective windshield frame and roll bar.

20. A folding roof according to claim 5, wherein an abutment is provided at the bearing plate means for retaining the tensioning lever means in an upright position.

21. A folding roof according to claim 1, wherein the tensioning lever means and the acutating lever are adapted to be fixed relative to the vehicle body when the folding roof is removed.

22. A folding roof according to claim 21, wherein a cam disposed on the actuating lever is supported in a recess of the tensioning lever means when the roof is removed and the tensioning lever means and actuating lever are fixed.

* * * * *